Patented Jan. 19, 1932

1,842,196

UNITED STATES PATENT OFFICE

THOMAS F. PINDER, OF MERION, PENNSYLVANIA

PRINTING PROCESS

No Drawing.    Application filed May 30, 1930. Serial No. 457,610.

The present invention relates to a printing process and more specifically to the preconditioning of stock ink previous to a solidifying treatment to set the ink for preventing off-setting.

Printing ink to meet all requirements of the trade must include certain ingredients of fixed proportions which create considerable delay in drying of the ink and therefore considerable expense in the operation of the present day type of rapid four color printing machines due to the use of offsetting sheets, offsetting rolls and delays in the completing of printing operations.

It is a well known fact in the trade that drying of the ink can be facilitated by changing the ingredients and the proportion of the ingredients of stock ink but these changes are at the sacrifice of other advantages. I have found from extensive experiments conducted that I can precondition stock ink and treat the same in a manner that not a single known advantage is sacrificed and additional new advantages obtained.

The primary object of my invention resides in the preconditioning of ink to make the same more receptive to my improved solidifying treatment so as to greatly facilitate the drying operation.

An object of my invention resides in the combining of two processes in a single treatment for the accomplishment of the complete drying of ink in a fraction of a minute to prevent offsetting.

Another object of the invention resides in the preconditioning of stock ink in a manner that uniform polymerization of the ink throughout is accomplished instantaneously when subject to my novel method of treatment thereby assuring a dried ink that will have all the necessary qualifications and which will positively not offset.

A feature of my invention resides in the treating of stock ink in a way that the same will not be greatly affected at ordinary temperature but when subject to my improved treatment internal and external reactions will take place that will assure a complete and uniform drying of the ink throughout its entire mass.

Still further objects of the invention will appear from the more detailed description of the preferred embodiment hereinafter fully set forth and are such as may be obtained by utilization of various combinations, sub-combinations and principles that are obvious from the information set forth.

As a first step in my printing process a special stock ink is prepared accomplished by including in the stock composition ingredients that oxidize temperatures and an ingredient that will give off oxygen only when heated above a predetermined degree and which will not take oxygen from the atmosphere. As an example of a stock ink to accomplish this objective just set forth I include in the stock ink an oxidizable oil such as linseed oil which as is well known includes a neutral fat which is glycerized linolenic acid and to which is due the drying properties of the linseed oil. This neutral fat contents I increase to a predetermined degree to increase the rapidity of drying. This may be accomplished in various ways but I prefer to increase jointly or singularly the fatty acids known as "linoleic" and "linolenic". I also include in the stock ink a substance that when heated above a predetermined degree will give off oxygen uniformly through the interior mass of the ink and this ingredient may be in the form of commercially known (rubrene peroxide) produced by bringing "rubrene" ($C_{42}H_{28}$) in contact with oxygen such as is present in the atmosphere, the rubrene absorbing a relatively large amount of oxygen. This particular ingredient is capable of giving off oxygen when heated above 212 degrees Fahrenheit, increasing this action rapidly as 400 degrees Fahrenheit is approached. It is characteristic of rubrene peroxide that the same will not take oxygen from the air and thus the oxygen atoms liberated within the stock ink by the rubrene peroxide can be definitely predetermined for the accomplishment of the most effective reaction.

Stock ink prepared or preconditioned as above set forth is not affected to any great extent when subject to ordinary atmospheric conditions for a short period of time but when subject to heat and a gaseous treatment interior and exterior reactions take place that produce instantaneous solidification of the ink throughout.

The second step in my printing process consists in treating the preconditioned stock ink after a printing operation in a manner that the oxidizing of the oils or ingredients of the stock ink is greatly facilitated and the oxygen liberating ingredient such as rubrene peroxide heated to a degree to liberate the oxygen atoms contained therein.

To accomplish this latter objective I subject the ink after a printing operation to an application of heat of a predetermined degree preferably above 212 degrees Fahrenheit so as to liberate the oxygen atoms of the rubrene peroxide and further heat treat the entire mass of ink. This action accomplishes an immediate oxidizing or polymerizing reaction throughout the entire mass of the ink. As this is taking place ozone in a chilled state is projected upon the exterior surface of the ink which accomplishes an exterior oxidizing reaction and thus it will be appreciated that the coaction between the interior and exterior oxidizing treatments assure a uniform polymerization of the ink throughout its entire mass and a surface conditioning that produces solidified ink having all trade requirements.

If found advisable in practice the ink after being subjected to a heat and ozone treatment may be subject to additional heat treatments.

I have found from actual experience that it is of great importance to chill the ozone previous to its contact with the ink that has been previously heated as heat has a tendency to destroy ozone which if took place is detrimental to the full accomplishment of the desired results due to the fact that it is necessary that the ozone in full volume be brought in direct contact with the heated ink.

Of course it is to be understood that various other substances may be substituted for rubrene peroxide, and the ink after a printing operation may be subject to other forms of treatments as the basic feature of my invention resides in the preconditioning of ink previous to its subjection to a treating operation, the two cojointly accomplishing the desired result. Therefore, I do not desire to be limited in protection in any manner whatsoever except as set forth in the following claims.

What I claim is:

1. A printing process consisting of impregnating stock ink with a substance giving off oxygen when heated above a predetermined degree and subjecting such conditioned ink after a printing operation to heat.

2. A printing process consisting of preparing a printing ink including as two of its ingredients a substance that gives off oxygen when heated to a predetermined degree and a substance capable of being oxidized at any temperature and subjecting such treated ink after a printing operation to heat and ozone.

3. A printing process consisting of including in stock ink an ingredient capable of giving off oxygen when heated above 212 degrees Fahrenheit and an ingredient oxidizable at ordinary temperture and subjecting said ink after a printing operation to heat at a temperature above 212 degrees Fahrenheit and to ozone.

4. A printing process consisting in impregnating stock ink containing linseed oil with an ingredient capable of giving off oxygen when heated from 212 degrees to 400 degrees Fahrenheit and treating such conditioned ink after a printing operation with heat of a temperature above 212 degrees Fahrenheit and with chilled ozone.

5. A printing process consisting of impregnating stock ink containing an oxidizable oil with rubrene peroxide and subjecting the stock ink after a printing operation to a heat and ozone treatment.

6. A printing process which consists in increasing the volume of the oxidizable ingredient of stock ink and adding a substance that is inert at ordinary temperature but capable of giving off oxygen when heated above 212 degrees Fahrenheit and incapable of taking oxygen from the air and finally treating said conditioned stock ink after a printing operation with heat and ozone.

7. A printing process which consists in preparing stock ink to include two drying substances one capable of liberating oxygen in the interior of the ink mass and the other capable of taking oxygen from air, and subject such conditioned ink to an application of heat and ozone.

8. A printing process which consists in preparing stock ink to include two drying substances one capable of liberating oxygen in the interior of the ink mass and the other capable of taking oxygen from the air and subject such conditioned ink to an application of heat and ozone.

9. A printing process which consists in preparing stock ink to include two drying substances one capable of liberating oxygen in the interior of the ink mass and the other capable of taking oxygen from the air and subject such conditioned ink to an application of heat and ozone, and finally to a second heat treatment, the ozone being chilled before contact with the ink.

10. A printing process which consists in increasing the natural fat content of stock ink adding an ingredient thereto that is capable of giving off oxygen when heated above 212 degrees Fahrenheit and subjecting such ink after a printing operation to heat and ozone.

In witness whereof I have hereunto set my hand.

THOMAS F. PINDER.